US005866847A

United States Patent [19]

Saka et al.

[11] Patent Number: 5,866,847

[45] Date of Patent: Feb. 2, 1999

[54] WIRE ASSEMBLY AND METHOD OF PRODUCTION THEREOF

[75] Inventors: Yuuji Saka; Nori Inoue; Takahiro Onizuka; Yoshito Oka; Hideo Matsuoka, all of Yokkaichi, Japan

[73] Assignee: Sumitomo Wiring Systems, Ltd., Japan

[21] Appl. No.: 705,133

[22] Filed: Aug. 29, 1996

[30] Foreign Application Priority Data

Aug. 29, 1995 [JP] Japan .................................... 7-220723

[51] Int. Cl.[6] ...................................................... H02G 3/16

[52] U.S. Cl. ........................................... 174/68.1; 174/250

[58] Field of Search .................................... 174/68.1, 250, 174/268, 138 G, 138 H, 261; 361/748; 219/542, 536, 463, 467; 392/432, 433, 435

[56] References Cited

U.S. PATENT DOCUMENTS

| | | | |
|---|---|---|---|
| 3,633,096 | 1/1972 | Bollman | 324/538 |
| 3,930,524 | 1/1976 | Tarbox | 140/93 R |
| 4,247,979 | 2/1981 | Eck | 29/611 |
| 4,387,509 | 6/1983 | Dechelette | 29/850 |
| 4,684,765 | 8/1987 | Beck et al. | 174/254 |
| 5,156,557 | 10/1992 | Okafuji et al. | 439/404 |

*Primary Examiner*—Nestor Ramirez

*Assistant Examiner*—Joseph Waks

*Attorney, Agent, or Firm*—Jordan B. Bierman; Bierman, Muserlian and Lucas

[57] ABSTRACT

A wire assembly is formed by insertion of a wire into a wire guide including a wire guide which is either a receiving groove or pairs of guide projections in or on an insulation substrate. Cramping terminals may be connected to the wire, and the wire may be cut in desired positions to separate it into a plurality of circuits. A retainer is provided which is at an angle to the leading end of the wire guide at a starting position. The wire is inserted into the wire guide after its leading end has been introduced into the wire retainer.

9 Claims, 2 Drawing Sheets

WIRE ASSEMBLY AND METHOD OF PRODUCTION THEREOF

This Application claims the benefit of the priority of Japanese Application 7-220723, filed Aug. 29, 1995.

The present Invention relates to a wire assembly for use in connection with internal circuits in an electrical connection box; it is particularly designed to facilitate wire laying by fixing a leading end of the wire to a substrate on which the wire forming the internal circuit is laid.

BACKGROUND OF THE INVENTION

In order to easily respond to design changes in the internal circuits of electrical connection boxes, they have been made from wires and cramping terminals instead of busbars formed from punched conductive metal plate. The cramping terminals connect the wires with each other as well as with external output terminals.

A wire receiving groove or guide, along which the wire is laid, is placed on an assembly board, and the wire is inserted between the wire guides or in the wire receiving groove. In a typical method, a continuous strand of wire is automatically laid by a suitable device from the starting point of the receiving groove to an end point thereof. Cramping terminals are mounted in appropriate positions for connection to the wire, and the continuous strand is cut at predetermined points to form separate circuits.

When the wire is laid, it is necessary to fix the wire to prevent longitudinal movement thereof; this has been done by inserting the leading end of the wire into a chuck disposed on the assembly board. The chuck holds the wire as it is laid on the substrate; however, it is necessary to introduce the leading end of the wire into the chuck and fix it in place and, after the completion of the wire laying, the wire has to be severed to release it from the chuck. Thus, the above prior art method requires (1) fixing the end of the wire to the chuck and (2) cutting and removing the extended portion of the wire after the wire pattern is complete. Moreover, this wastes the extended wire portion which must be cut and removed.

U.S. Pat. No. 4,684,765 discloses a method for laying a wire on a base plate in which the leading end of the wire is bent downwardly, inserted into a through-hole and held therein by a processor head having a cutter blade. However, in order to provide the through-hole, the base plate must have an increased thickness. Another problem resides in the necessity of having a cutter blade for inserting the wire into the through-hole, thus complicating the apparatus.

SUMMARY OF THE INVENTION

In view of the above problems, it is an object of the present Invention to provide a wire assembly for internal circuits within an electrical connection box which facilitates the laying of the wire in the desired pattern by fixing the leading end of the wire to the substrate on which the wire is laid.

According to the Invention, there is provided a wire pattern wherein a continuous strand of wire is inserted into the wire guide of at least one substrate. A retainer for the leading end is arranged at an angle to the wire guide at a starting position. The leading end of the wire is inserted into the retainer; it is then bent and laid into the wire guide. According to a preferred embodiment of the Invention, the wire guide is a groove and/or one or more pairs of guide projections formed in or on the substrate.

Preferably, the retainer is substantially arranged on or in the substrate or in the plane thereof. It is a feature of the Invention that the retainer does not project substantially outwardly or inwardly from the surface of the substrate. Thus, the wire is fully disposed on or at the substrate surface.

According to a modification of the Invention, the wire is cut in desired positions to form separate circuits. The retainer can comprise pairs of guide projections having substantially the same shape as the wire guide, and is at an angle to the leading end thereof. Accordingly, if the wire is continuously laid after inserting its leading end into the retainer and bending it as the wire enters the wire guide, the wire can be prevented from longitudinal movement.

As is clear from the above description, unlike the prior art, it is not necessary to dispose a chuck on the assembly board for fixing the wire end, nor is it necessary to provide superfluous wiring to secure the wire end to the chuck; thus, it is also feasible to eliminate the step of fixing the wire end to the chuck. Therefore, the assembly can be carried out with greater ease and simplicity.

In a particularly advantageous form of the Invention, the retainer is at an acute angle to the leading end of the wire guide. Alternatively, the retainer may comprise a first side portion, which is at a substantially right or obtuse angle to the leading end of the wire guide, and a second side portion, which is at a substantially right or obtuse angle to the leading end of the first side portion. It is desirable that the second side portion be longer than the first side portion. With the foregoing arrangements, the wire is not displaced when it is laid in the wire guide, as it is securely held by the retainer.

In the accompanying drawings, constituting a part hereof, and in which like reference characters indicate like parts, FIG. 1 is a plan view of an insulation plate substrate on which a wire forming internal circuits according to the Invention is laid;

Figure 1:
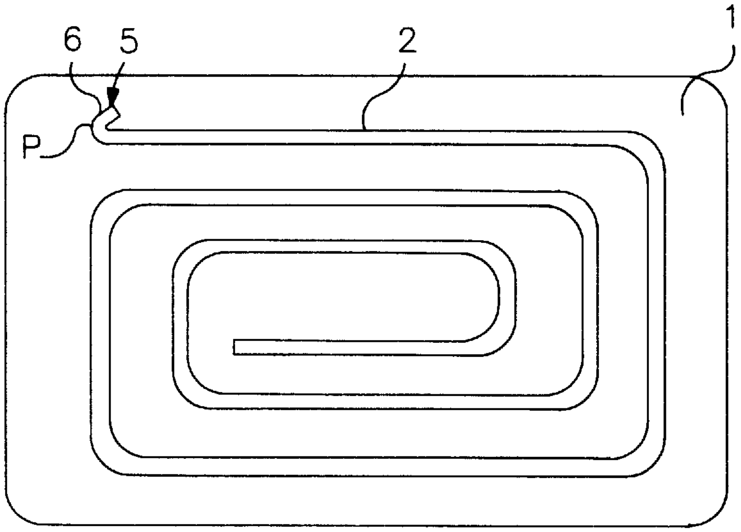
Figure 2:
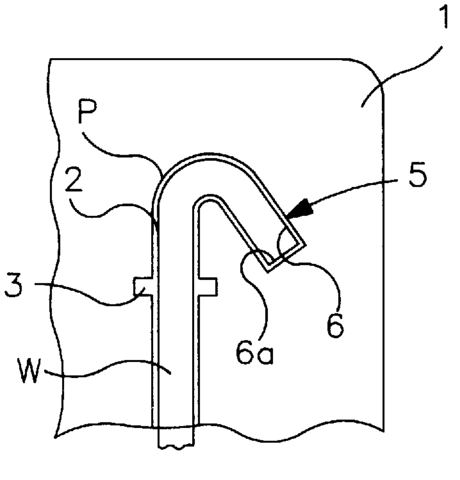
FIG. 2 is an enlarged plan view of a portion of FIG. 1.

FIGS. 1 and 2 show a wire pattern wherein a continuous strand of wire W is laid, by an automatic wire laying apparatus, from a starting point to an end point in a groove formed in a substrate according to a wire layout pattern. Wire receiving groove 2 is formed in insulation plate 1, and wire W is inserted therein.

Insulation plate 1 is provided with wire receiving groove 2 and retainer 5. The latter comprises retaining groove 6 having end portion 6*a* and joins receiving groove 2 at an acute angle at starting position P. Terminals 3 are located as desired along retaining groove 2 in contact with wire W and for connection with external circuits.

To produce the assembly of the present Invention, the leading end of wire W is first inserted into groove 6 at end portion 6*a*. It is then bent around the acute angle at starting position P and is continuously and automatically laid into receiving groove 2. As a result, retainer 5 is able to prevent slippage of wire W as it is pulled while being automatically laid in groove 2.

Thus, unlike the prior art, it is not necessary to dispose, on an assembly board, a chuck for fixing the wire end, nor is it necessary to extend the wire thereto. Further, assembly is simplified since there is no chuck to which the wire end must be fixed, nor is there any need for cutting, removing and discarding the unwanted portion of the wire after wire W has been inserted into grooves 2 and 6.

Figure 3:
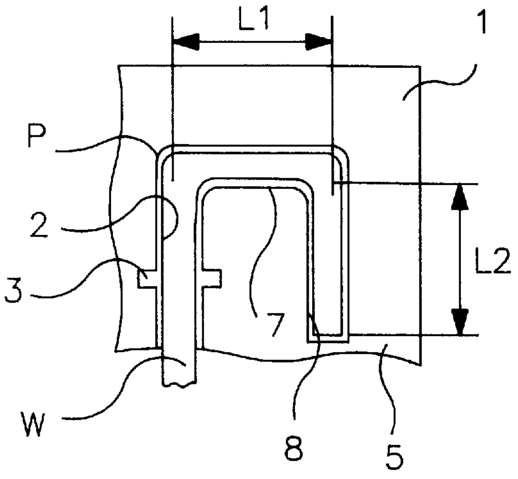
FIG. 3 is an enlarged plan view similar to that of FIG. 2, of a layout of internal circuits according to a modification of the Invention.

FIG. 3 shows a modification of the present Invention. Retainer 5 in insulation plate 1 includes first side portion 7 and second side portion 8. Side portion 7 is a groove at approximately a right angle to the leading end of wire groove 2 and, in turn, side portion 8 is a groove at approximately a right angle to the leading end of side portion 7. Advantageously, length L2 of second side portion 8 is greater than length L1 of first side portion 7 (i.e. L2>L1). Particularly, it is preferable that length L2 be as long as possible, while length L1 is less important, but should be kept small to reduce the size of the assembly.

To produce this modification, the leading end of wire W is inserted into second side portion 8 by an automatic wire laying apparatus; it is then bent and laid into first side portion 7, and is bent again and laid into receiving groove 2. Thus, retainer 5 has a reduced securing function as compared to the corresponding element of the first embodiment because the bent portions between groove 2 and portion 7 and between first and second side portions 7 and 8 are at right angles, not acute angles. However, since this retainer 5 has two bent portions and second side portion 8 is longer than first side portion 7, the leading end of wire W can be securely held. This is true even if side portions 7 and 8 are connected at obtuse angles.

Figure 4:
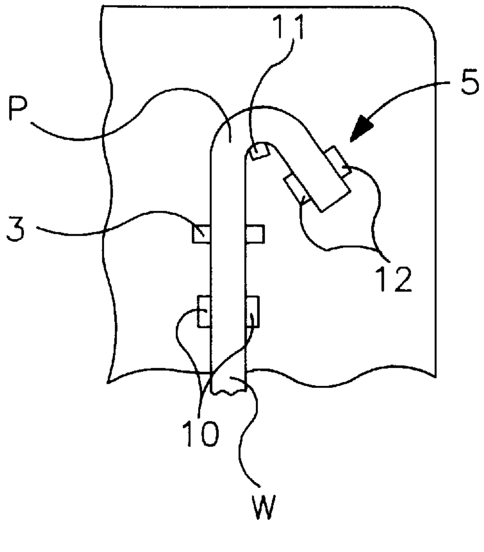
FIG. 4 is an enlarged plan view, similar to that of FIG. 3, of a layout of internal circuits according to a third embodiment of the Invention.

FIG. 4 shows an assembly which includes pairs of guide projections 10 projecting from insulation plate 1 in specified positions along the layout pattern of wire W. Wire W is retained between the pairs of guide projections 10. At starting position P, bending projection 11 is provided at the inner side of the bend, and retaining projections 12 for securing the leading end of wire W are located at a specified distance from bending projection 11.

The wire laying groove or guiding projections have been specifically described with respect to an insulation plate as the substrate. However, it will be appreciated that the Invention is useful even when the receiving groove or guiding projections are in or on an upper casing or lower casing of an electrical connection box, or elsewhere.

While only certain specific embodiments of the present Invention have been expressly disclosed, it is, nonetheless, to be broadly construed and not to be limited except by the character of the claims appended hereto.

What we claim is:

1. A wire assembly comprising an insulation substrate, a wire guide on said substrate, a retainer adjacent said wire guide and in communication therewith at a starting position thereof, said retainer comprising a retaining groove at a retaining angle said angle being an acute angle to said wire guide at said starting position, a leading end of a continuous wire in said retainer, bent around said retaining angle at said starting position, and in said wire guide, said wire guide comprising at least one projection protruding from said substrate.

2. The wire assembly of claim 1 wherein said wire guide is a wire groove.

3. The wire assembly of claim 1 wherein there is at least one pair of projections and said wire is therebetween.

4. The wire assembly of claim 1 wherein another of said wire groove and said retaining groove comprises at least one projection protruding from said substrate.

5. The wire assembly of claim 1 wherein said retainer comprises a first side portion at a first angle to said wire guide, and a second side portion at a second angle to a leading end of said first side portion, said first angle and said second angle being other than, 90° and 180°.

6. The wire assembly of claim 5 wherein said second side portion is longer than said first side portion.

7. A method of making the wire assembly of claim 5 comprising inserting said leading end into said second portion, bending said wire around said second angle, inserting said wire into said first portion, bending said wire around said first angle, and inserting said wire into said wire guide.

8. The wire assembly of claim 1 wherein said substrate is in an upper casing of an electrical connection box, a lower casing of an electrical connection box, or an insulation plate.

9. A method of making the wire assembly of claim 1 comprising inserting said leading end into said retainer, bending said wire around said angle, and inserting said wire into said wire guide.

* * * * *